United States Patent
Chakrabarty et al.

(10) Patent No.: US 9,800,727 B1
(45) Date of Patent: Oct. 24, 2017

(54) AUTOMATED ROUTING OF VOICE CALLS USING TIME-BASED PREDICTIVE CLICKSTREAM DATA

(71) Applicant: FMR LLC, Boston, MA (US)

(72) Inventors: Bibhash Chakrabarty, Karnataka (IN); Alex Arias-Vargas, Foxboro, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/294,472

(22) Filed: Oct. 14, 2016

(51) Int. Cl.
| | |
|---|---|
| *H04M 3/00* | (2006.01) |
| *H04M 5/00* | (2006.01) |
| *H04M 3/523* | (2006.01) |
| *H04M 3/51* | (2006.01) |
| *H04L 29/08* | (2006.01) |
| *G06F 17/30* | (2006.01) |
| *G06N 7/00* | (2006.01) |
| *G06Q 30/02* | (2012.01) |

(52) U.S. Cl.
CPC .... *H04M 3/5232* (2013.01); *G06F 17/30867* (2013.01); *G06N 7/005* (2013.01); *G06Q 30/0201* (2013.01); *H04L 67/02* (2013.01); *H04L 67/146* (2013.01); *H04M 3/5191* (2013.01); *G06F 17/30477* (2013.01)

(58) Field of Classification Search
CPC .. H04M 15/721; H04M 3/5183; H04M 3/523; H04M 3/51
USPC ............. 379/265.09, 265.05, 265.1, 265.11, 379/265.13, 265.01
See application file for complete search history.

(56) References Cited

U.S. PATENT DOCUMENTS

| | | | |
|---|---|---|---|
| 8,078,625 | B1 | 12/2011 | Zhang et al. |
| 9,361,446 | B1 * | 6/2016 | Demirjian ............... G06F 21/36 |
| 2004/0030780 | A1 | 2/2004 | Walters |
| 2009/0083266 | A1 | 3/2009 | Poola et al. |
| 2010/0114654 | A1 | 5/2010 | Lukose et al. |
| 2012/0239667 | A1 | 9/2012 | Vysyaraju et al. |
| 2013/0132366 | A1 | 5/2013 | Pieper |
| 2017/0180567 | A1 * | 6/2017 | Sharma ............. H04M 15/8044 |

* cited by examiner

*Primary Examiner* — Thjuan K Addy
(74) *Attorney, Agent, or Firm* — Proskauer Rose LLP

(57) ABSTRACT

Methods and apparatuses are described for automated routing of voice calls using time-based predictive clickstream data. A server captures clickstream data comprising uniform resource locators (URLs) and one or more timestamps of a web session. The server converts the clickstream data into tokens and generates a frequency matrix based upon the tokens. The server generates a feature vector based upon the frequency matrix. The server receives an incoming voice call from a remote device and identifies that the remote device is associated with a user of the client computing device. The server determines intent for the incoming voice call based upon the feature vector, and routes the incoming voice call to a destination device based upon the determined intent.

27 Claims, 5 Drawing Sheets

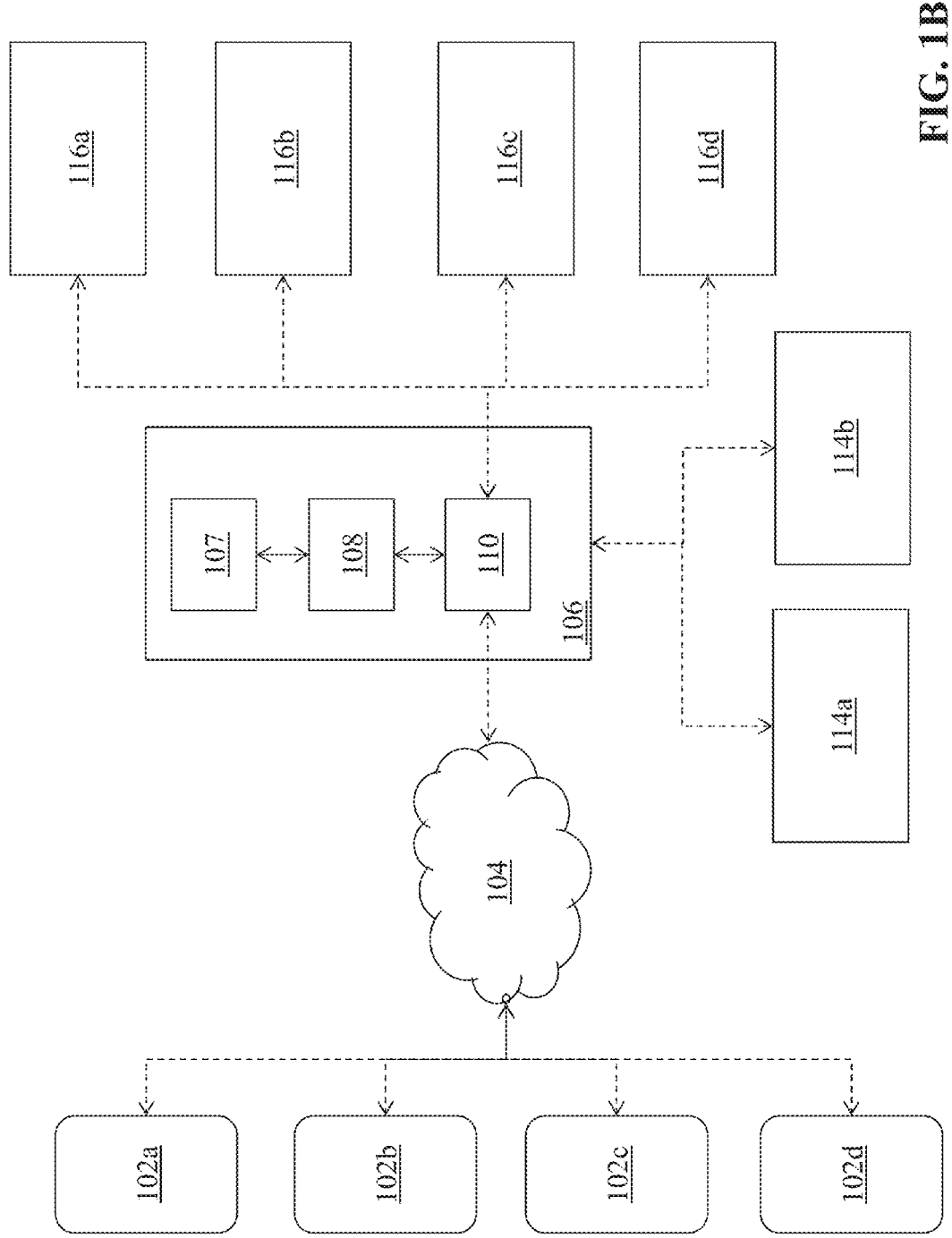

AUTOMATED ROUTING OF VOICE CALLS USING TIME-BASED PREDICTIVE CLICKSTREAM DATA

TECHNICAL FIELD

This application relates generally to methods and apparatuses, including computer program products, for automated routing of voice calls using time-based predictive clickstream data.

BACKGROUND

In a typical call center environment, routing of inbound calls is conducted without any advance knowledge of the caller's intent or reason behind the call. For example, some call centers simply route calls in a first-in-first-out (FIFO) manner to available customer service representatives (CSRs) without regard to the reason for the call or the skillset of the individual CSRs—as some CSRs may be better equipped or experienced to handle specific types of calls. In this scenario, it is not uncommon for a single call to be manually rerouted to multiple different CSRs before reaching an appropriate representative. As a result, the average time for calls on hold and for support resolution increases, adversely affecting the customer experience.

In another scenario, call centers are configured to obtain just-in-time information about the caller and/or call, usually by leveraging automated systems such as interactive voice response (IVR) technology or automated attendants, and then route the call to a CSR based upon this information. In these examples, the IVR prompts are typically limited to predefined, broad options and generally do not accurately reflect the specific intent behind a customer's call. As a result, it may take several minutes for a customer to navigate an IVR menu in order to reach a CSR, and yet the CSR may still have to request or verify such information from a caller before the CSR can fully understand why the customer is calling and formulate an appropriate response. In addition, current IVR systems—even systems that utilize natural language-driven processing—only capture a single intent from a customer call. Most such calls are multi-intent and usually need to be sent to a higher skill CSR in order to avoid further transfers and improve the customer experience.

In both scenarios, the call center system is not configured to obtain any pre-call knowledge about the potential intent behind the incoming call. However, in many instances, a caller contacts a customer service center after first interacting with the same organization in another capacity, namely, via web browsing. For example, a customer may use his computing device to navigate to the organization's website and search or click for information that may be responsive to his needs—resulting in the generation of clickstream data associated with the customer's browsing session. Such clickstream data contains a myriad of information, such as URLs, search queries, metadata, and the like that is potentially relevant to future interactions with the same customer. Upon obtaining some information (or being unable to fully obtain the desired information) from the website, the customer may initiate a voice call to the call center of the organization for additional assistance.

SUMMARY

Therefore, what is needed are methods and systems for dynamically leveraging pre-call clickstream data to understand and/or predict a reason, or multiple reasons, for a subsequent voice call to the call center, to result in a more efficient, accurate, and tailored response to the call. As an example, the techniques described herein result in tangible improvements of increased customer engagement (a customer engagement index increased by two percent), nearly fifty percent of all incoming calls to a call center were routed according to the methods and systems described herein, and call center representative-to-representative transfer rates decreased by over five percentage points.

The techniques described herein provide the advantage of using machine learning to generate a complex feature matrix and classification model, based upon historical clickstream data and voice call information, which is then used to predict the underlying intent for subsequent calls to, e.g., a call center. The techniques described herein also provide the advantage of parsing clickstream data using a time-based tokenization process that accounts for the amount of time elapsed between the clickstream activity and a corresponding voice call in order to better predict the reason behind a specific voice call.

The invention, in one aspect, features a method for automated routing of voice calls using time-based predictive clickstream data. At a first point in time, a server computing device captures clickstream data corresponding to one or more web browsing sessions between a client computing device and a web server. The clickstream data includes uniform resource locators (URLs) and one or more timestamps of the corresponding session. The server computing device converts the clickstream data into tokens by filtering the URLs to retain intent-relevant URLs; parsing each intent-relevant URLs into one or more tokens, each token comprising a discrete text segment of the corresponding URL; and assigning a time value to each token that is associated with at least one of the timestamps from the corresponding web browsing session. The server computing device generates a frequency matrix based upon the tokens. The frequency matrix includes, for each token and web browsing session: (i) a frequency of the token appearing in the intent-relevant URLs in the session ("TF") and (ii) a log transform of an inverse of a ratio of number of distinct intent-relevant URLs that include the token over the number of intent-relevant URLs in the session ("IDF"). The server computing device generates a feature vector based upon the frequency matrix. The feature vector includes, for each token, a value indicating a product of TF and IDF. At a second point in time, the server computing device receives an incoming voice call from a remote device and identifies that the remote device is associated with a user of the client computing device. The server computing device determines intent for the incoming voice call based upon the feature vector and routes the incoming voice call to a destination device based upon the determined intent.

The invention, in another aspect, features a system for automated routing of voice calls using time-based predictive clickstream data. The system comprises a server computing device. At a first point in time, a server computing device captures clickstream data corresponding to one or more web browsing sessions between a client computing device and a web server. The clickstream data includes uniform resource locators (URLs) and one or more timestamps of the corresponding session. The server computing device converts the clickstream data into tokens by filtering the URLs to retain intent-relevant URLs; parsing each intent-relevant URLs into one or more tokens, each token comprising a discrete text segment of the corresponding URL; and assigning a time value to each token that is associated with at least one of the timestamps from the corresponding web browsing session. The server computing device generates a frequency matrix based upon the tokens. The frequency matrix includes, for each token and web browsing session: (i) a frequency of the token appearing in the intent-relevant URLs in the session ("TF") and (ii) a log transform of an inverse of a ratio of number of distinct intent-relevant URLs that include the token over the number of intent-relevant URLs in the session ("IDF"). The server computing device generates a feature vector based upon the frequency matrix. The feature vector includes, for each token, a value indicating a product of TF and IDF. At a second point in time, the server computing device receives an incoming voice call from a remote device and identifies that the remote device is associated with a user of the client computing device. The server computing device determines intent for the incoming voice call based upon the feature vector and routes the incoming voice call to a destination device based upon the determined intent.

The invention, in another aspect, features a computer program product, tangibly embodied in a non-transitory computer readable storage device, for automated routing of voice calls using time-based predictive clickstream data. The computer program product includes instructions operable to cause a server computing device to capture, at a first point in time, clickstream data corresponding to one or more web browsing sessions between a client computing device and a web server. The clickstream data includes uniform resource locators (URLs) and one or more timestamps of the corresponding session. The computer program product includes instructions operable to cause the server computing device to convert the clickstream data into tokens by filtering the URLs to retain intent-relevant URLs; parsing each intent-relevant URLs into one or more tokens, each token comprising a discrete text segment of the corresponding URL; and assigning a time value to each token that is associated with at least one of the timestamps from the corresponding web browsing session. The computer program product includes instructions operable to cause the server computing device to generate a frequency matrix based upon the tokens. The frequency matrix includes, for each token and web browsing session: (i) a frequency of the token appearing in the intent-relevant URLs in the session ("TF") and (ii) a log transform of an inverse of a ratio of number of distinct intent-relevant URLs that include the token over the number of intent-relevant URLs in the session ("IDF"). The computer program product includes instructions operable to cause the server computing device to generate a feature vector based upon the frequency matrix. The feature vector includes, for each token, a value indicating a product of TF and IDF. The computer program product includes instructions operable to cause the server computing device to receive, at a second point in time, an incoming voice call from a remote device and identify that the remote device is associated with a user of the client computing device. The computer program product includes instructions operable to cause the server computing device to determine intent for the incoming voice call based upon the feature vector and route the incoming voice call to a destination device based upon the determined intent.

Any of the above aspects can include one or more of the following features. In some embodiments, filtering the URLs comprises removing URLs from the clickstream data that are previously determined to be irrelevant to intent. In some embodiments, converting the clickstream data into tokens further comprises determining one or more tags embedded in a webpage that corresponds to one of the intent-relevant URLs; and capturing the tags as part of the clickstream data. In some embodiments, the URLs include one or more search keywords, the server computing device correcting errors in the search keywords by comparing the search keywords against a predefined list of keywords.

In some embodiments, converting the clickstream data into tokens further comprises identifying one or more alphanumeric codes in the intent-relevant URLs that correspond to a financial security; and inserting other information relating to the financial security into the intent-relevant URL. In some embodiments, the alphanumeric codes are CUSIP numbers.

In some embodiments, parsing each intent-relevant URLs into one or more tokens comprises removing generic and user-specific portions of each intent-relevant URL based upon a predefined syntax; identifying one or more non-alphanumeric characters in the URL; splitting each intent-relevant URL into sections based upon a position of the non-alphanumeric characters in the URL; removing the non-alphanumeric characters from the URL; and identifying one or more tokens within each section. In some embodiments, the time value assigned to each token is a past window of time during which the associated web browsing session occurred. In some embodiments, determining intent for the incoming voice call comprises weighting each token in the feature vector according to the assigned time value of the token. In some embodiments, tokens with an assigned time value that is closer to the second point in time are given more weight than tokens with an assigned time value that is farther from the second point in time.

In some embodiments, determining intent for the incoming voice call comprises comparing tokens in the feature vector with a predefined list of intents and selecting an intent from the predefined list of intents that matches the tokens in the feature vector. In some embodiments, identifying that the remote device is associated with a user of the client computing device comprises receiving a device identifier from the remote device; determining an identity of a user associated with the remote device based upon the device identifier; and determining that the identity of the user is also associated with the client computing device. In some embodiments, identifying that the remote device is associated with a user of the client computing device comprises receiving a user identifier from the remote device; determining an identity of a user associated with the remote device based upon the user identifier; and determining that the identity of the user is also associated with the client computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1B is a block diagram of a distributed architecture for the system for automated routing of voice calls using time-based predictive clickstream data.

DETAILED DESCRIPTION

Figure 1A:
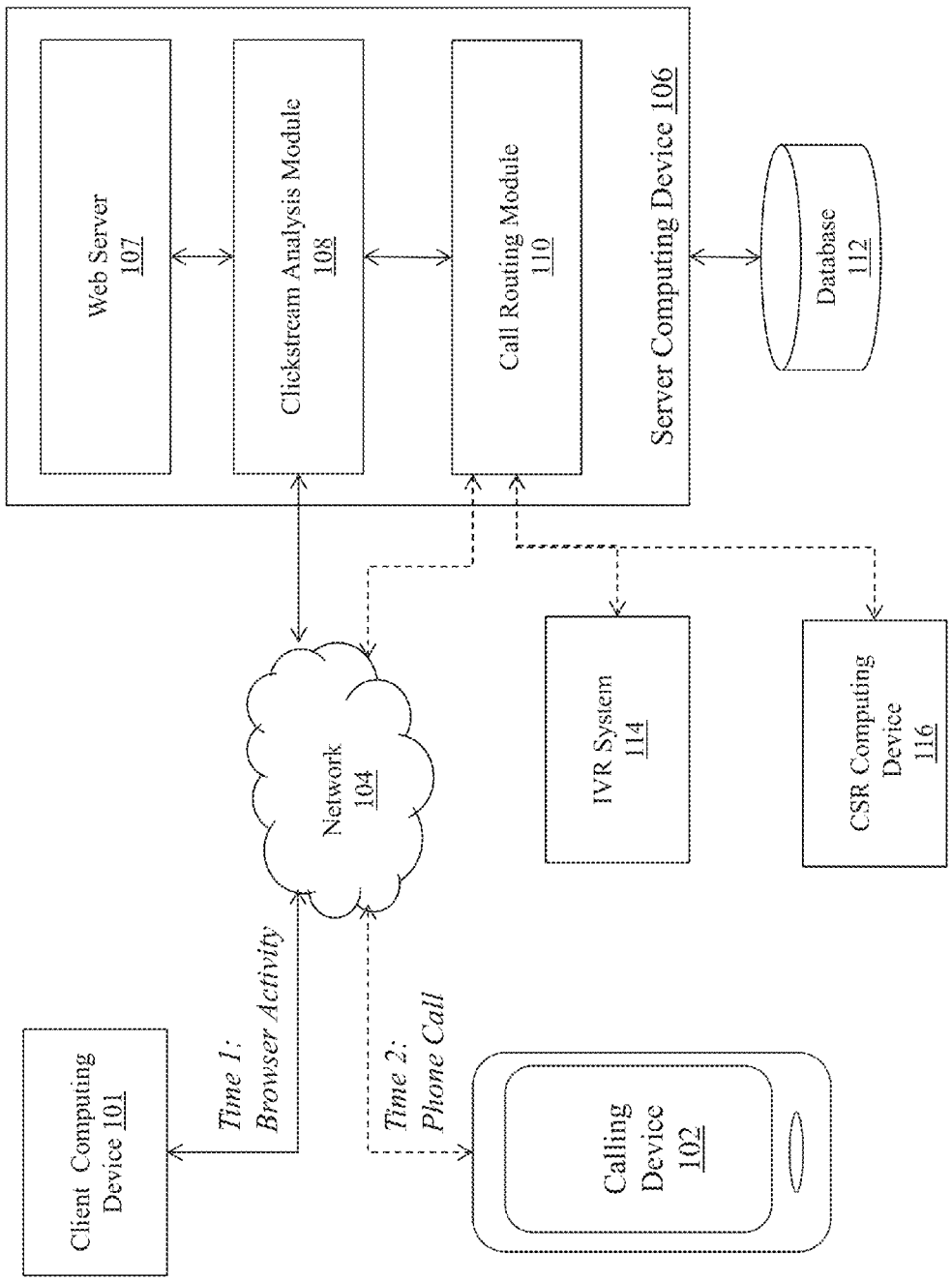
FIG. 1A is a block diagram of a system for automated routing of voice calls using time-based predictive clickstream data.

FIG. 1A is a block diagram of a system 100 for automated routing of voice calls using time-based predictive clickstream data. The system 100 includes a client computing device 101, a calling device 102 (e.g., a mobile phone), a communications network 104, a server computing device 106 with a web server 108, a clickstream analysis module 108 and a call routing module 110, a database 112, an interactive voice response system 114 and a customer service representative (CSR) computing device 116.

The client computing device 101 connects to the communications network 104 in order to communicate with the server computing device 106 for the purpose of, e.g., browsing web content (e.g., pages addressed with uniform resource locators (URLs) using browser software installed on the client device 101. For example, client computing device 101 can execute browser software (e.g., Chrome™ from Google, Inc., Microsoft® Edge available from Microsoft Corporation, and/or Mozilla® Firefox available from Mozilla Corporation) that connects to web server 108 at server computing device 106. It should be appreciated that the client device 101 can be operated to navigate to a plurality of different web pages denoted with URLs that may be part of the same website or may comprise multiple different websites. Exemplary client computing devices 101 include but are not limited to desktop computers, laptop computers, tablets, mobile devices, smartphones, and internet appliances.

The calling device 102 connects to the communications network 104 in order to communicate with the server computing device 106 for the purpose of, e.g., establishing a telephone call with a customer service representative at a call center. For example, the calling device 102 can be operated to initiate a telephone call with the server computing device 106, which can determine intent of the caller (or reason for the call) and route the call to, e.g., IVR system 114 and/or CSR computing device 116. Exemplary calling devices 102 include but are not limited to telephones, mobile devices, smartphones, telephony-based software applications executing on computing devices, and the like.

It should be appreciated that other types of client computing devices 101 and calling devices 102 that are capable of connecting to the components of the system 100 can be used without departing from the scope of invention. Also, although FIG. 1A depicts a separate client computing device 101 and calling device 102, it should be appreciated that the devices 101, 102 can comprise the same physical hardware (e.g., a smartphone) that performs the functions described herein.

The communication network 104 enables the other components of the system 100 to communicate with each other in order to perform the process of automated routing of voice calls using time-based predictive clickstream data as described herein. The network 104 may be a local network, such as a LAN, a wide area network, such as the Internet and/or a cellular network, or a combination of each. In some embodiments, the network 104 is comprised of several discrete networks and/or sub-networks (e.g., cellular to Internet) that enable the components of the system 100 to communicate with each other.

The server computing device 106 is a combination of hardware and software that includes specialized hardware and/or software modules that execute on a processor and interact with memory modules of the server computing device 106, to receive data from other components of the system 100, transmit data to other components of the system 100, and perform functions for automated routing of voice calls using time-based predictive clickstream data as described herein. The server computing device 106 includes a web server 107, a clickstream analysis module 108, and a call routing module 110 that execute on the processor of the server computing device 106. In some embodiments, the web server 107, the clickstream analysis module 108, and the call routing module 110a are specialized sets of computer software instructions programmed onto a dedicated processor in the server computing device 106 and can include specifically-designated memory locations and/or registers for executing the specialized computer software instructions. Further explanation of the specific processing performed by the web server 107, the clickstream analysis module 108, and the call routing module 110 is provided below.

The web server 107 is a hardware and/or software module that interacts with client computing device 101 via its browser software to handle incoming web-based requests (e.g., via HTTP) and to serve web-related content to the client computing device 101. For example, a user at the client computing device 101 can open a browser and type in a URL that points to particular web content served by the web server 107. The client device 101 establishes a connection with the server computing device 106 via communications network 104 (e.g., the internet) and the web server 107 provides the requested content.

As can be appreciated, the connection between the client device 101 and the web server 107 constitutes a session during which the client device 101 can request a plurality of content that may be located at various URLs served by the web server 107 and the client device 101 can submit other requests (e.g., search queries) for processing by the web server 107. The web server 107 can store attributes of the session, including a list of URLs accessed by the client device 107, search queries submitted by the client device 101, and metadata about the session (e.g., timestamps, duration, device-specific information, user-specific information, and the like) in, e.g., database 112 for subsequent analysis and use. The clickstream analysis module 108 captures the session attributes, including those noted above, and analyzes the attributes to generate a feature matrix and classification model for predicting intent of a subsequent call as is described in detail later in the specification. As shown in FIG. 1A, the connection between the client computing device 101 and the web server 107 traverses the clickstream analysis module 108; in some embodiments, however, the client computing device 101 is capable of connecting to the web server 107 without traversing the clickstream analysis module 108. In the latter case, the web server 107 can transmit the relevant session attributes to the clickstream analysis module 108 for processing.

The call routing module 110 receives inbound calls from, e.g., calling device 102 and determines whether to route the calls to the IVR system 114 and/or the CSR computing device 116 based upon information provided by the clickstream analysis module 108. For example, the call routing module 110 can correlate information associated with the inbound call (e.g., an identity of the caller) with information provided by the clickstream analysis module 108 (e.g., predicted intent of the call based upon time-based browsing history of the same caller) to determine a destination for the call.

Detailed functionality of the web server 107, clickstream analysis module 108, and call routing module 110 is provided later in the specification.

The database 112 is a computing device (or in some embodiments, a set of computing devices) that is coupled to the server computing device 106 and is configured to receive, generate, and store specific segments of data relating to the process of automated routing of voice calls using time-based predictive clickstream data as described herein. In some embodiments, all or a portion of the database 112 can be integrated with the server computing device 106 or be located on a separate computing device or devices. For example, the database 112 can comprise one or more databases, such as MySQL™ available from Oracle Corp. of Redwood City, Calif.

The IVR system 114 is a computing device that processes calls received from calling device 102 and routed through the server computing device 106 to, e.g., play recorded messages and voice prompts to calling device 102 for the purpose of answering a request or ascertaining the intent behind or reason for the call. For example, once the IVR system 114 has determined such intent, the IVR system 114 can instruct the call routing module 110 to direct the call to an appropriate CSR computing device 116 for servicing. It should be appreciated that in some embodiments, the IVR system 114 can be integrated with the server computing device 106 as, e.g., a logical software module executed by a processor of the server computing device 106.

The CSR computing device 116 is a computing device coupled to the server computing device 106 that receives calls from the server computing device 106 and executes software applications for the purpose of, e.g., enabling a customer service representative stationed at the device 116 to answer the calls and provide information and assistance to the caller. Exemplary CSR computing devices 116 include but are not limited to desktop computers, laptop computers, tablets, and the like. In some embodiments, the CSR computing device 116 is coupled to a telephone that handles the call signaling and voice communications, while the device 116 receives other information relating to the call (e.g., caller identity information, call pre-processing information) from server computing device 106.

FIG. 1B is a block diagram of a distributed architecture 100 of the system of FIG. 1. As can be appreciated, a call center may receive incoming voice calls from a plurality of calling devices (e.g., devices 102a-102d) that need to be routed to a plurality of different CSR computing devices 116a-116d (and/or IVR systems 114a-114b) in order to properly service the calls. As a result, the server computing device 106, in conjunction with call routing module 110, acts as a device hub for this routing functionality within a single call center or, in some embodiments, across multiple call centers.

Figure 2:
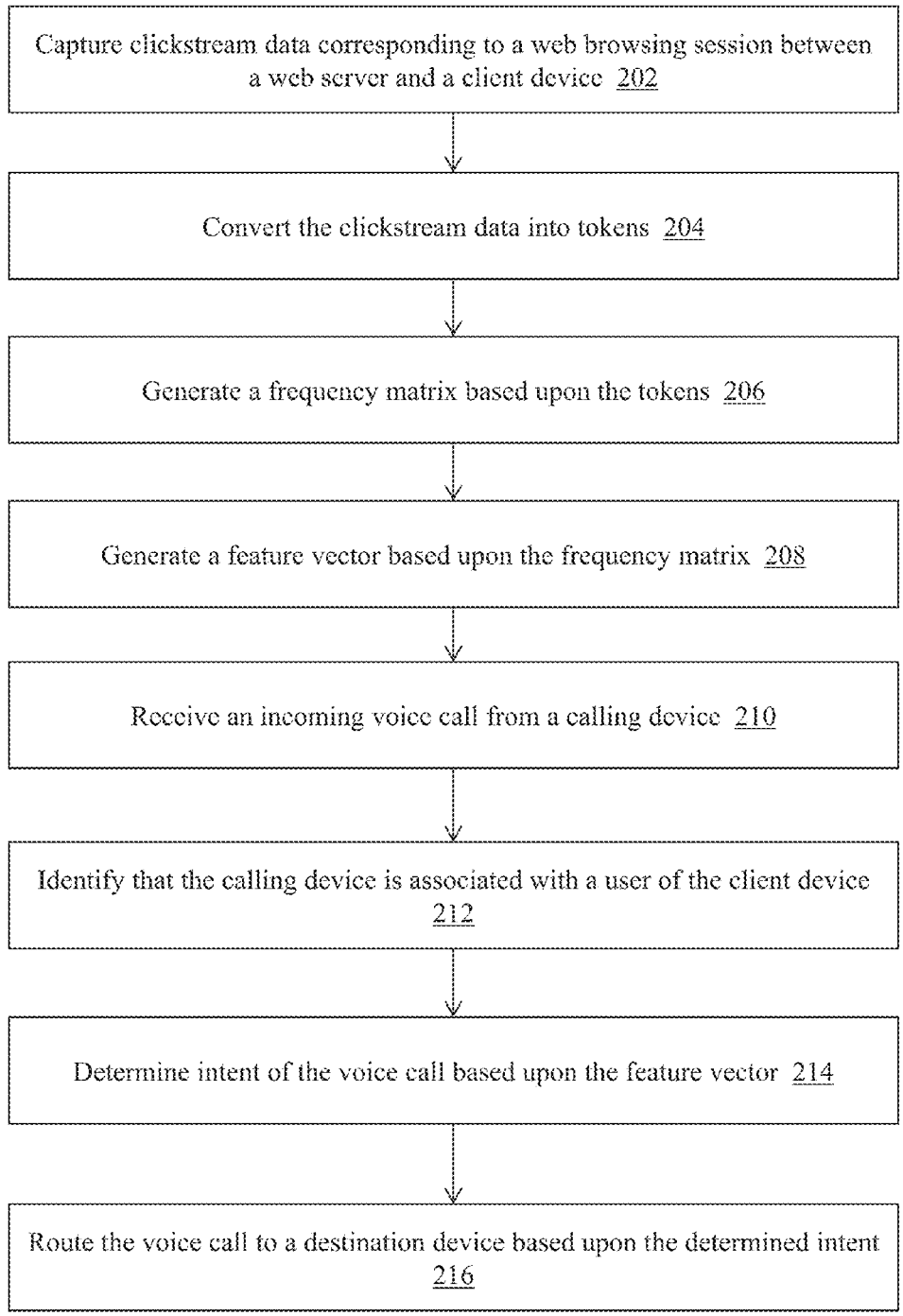
FIG. 2 is a flow diagram of a method for automated routing of voice calls using time-based predictive clickstream data.

FIG. 2 is a flow diagram of a method 200 for automated routing of voice calls using time-based predictive clickstream data, using the system 100 of FIG. 1A. At a first point in time, the client computing device 101 (e.g., a desktop computer with browser software) establishes a connection to the web server 107 and begins a web browsing session in order to, e.g., navigate web pages and other content that are associated with one or more URLs. As the client computing device 101 is navigating the web content, the clickstream analysis module 108 captures (202) clickstream data corresponding to the web browsing session. In this instance, clickstream data is data that is associated with the navigation activity occurring during the web browsing session. For example, the clickstream data can comprise a plurality of individual URLs that the client computing device 101 requests and/or accesses during the session. As is known, a URL is a text string that comprises an address for specific web content, such as a web page. URLs can include various types of information, including but not limited to tags, search keywords, server addresses, application names, user identifiers, device identifiers, and the like. As a representative example, a URL may be http://oltx.abc.com/ftgw/fbc/ofsummary/summary. In addition, the clickstream data can include other types of data and metadata that relate to the web browsing session, including but not limited to fillable form information, user inputs, timestamps (e.g., start time of the session, end time of the session, duration of the session), and so forth.

Figure 3:
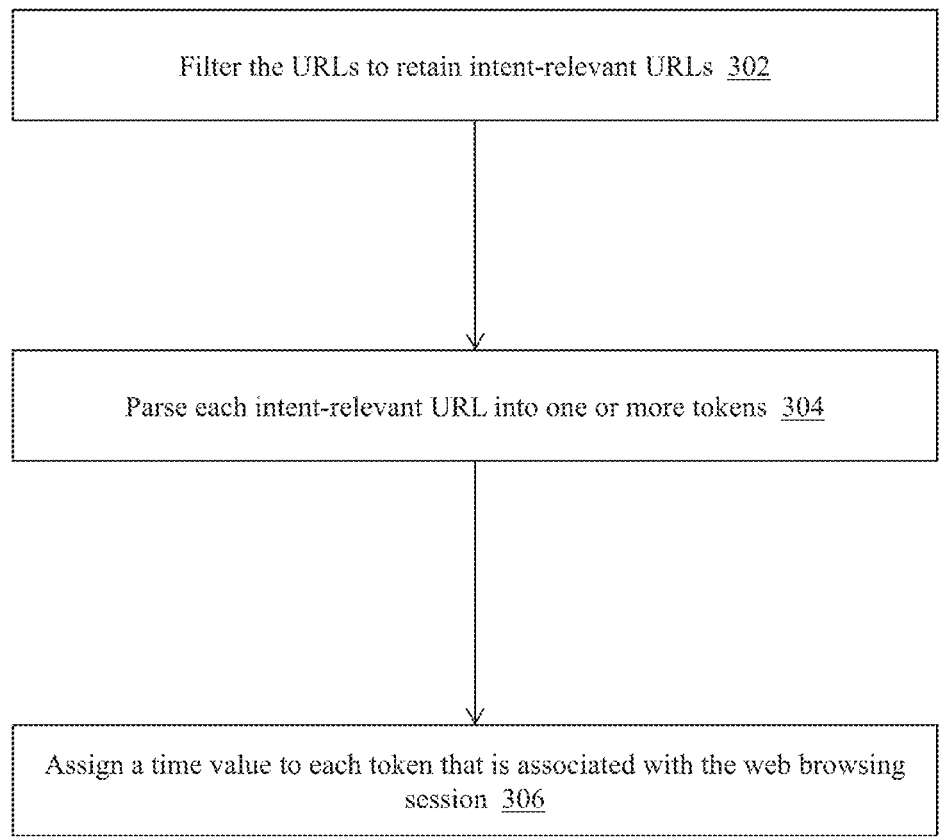
FIG. 3 is a flow diagram of a method for converting clickstream data into tokens.

Either during the web browsing session, or sometime after completion of the web browsing session, the clickstream analysis module 108 converts (204) the clickstream data into tokens that are then used by the system 100 to generate a model used to predict or determine intent of subsequent voice calls by the user (or by other users). FIG. 3 is a detailed flow diagram of a method 300 to convert the clickstream data into tokens.

As shown in FIG. 3, the clickstream analysis module 108 filters (302) the URLs collected as part of the clickstream data to retain intent-relevant URLs. For example, the module 108 can determine that certain URLs which may be accessed by a user are not relevant to determining intent of that user, such as certain URLs that point to generic login or logoff pages, certain URLs that point to high-level summary pages, certain URLs that point to transitory pages, certain URLs that are user- or product-specific, URLs that correspond to image loads within a page, redundant URLs (e.g., frame loads for the same HTML page that get captured as different URLs in addition to the original page URL), and so forth. The module 108 can dynamically determine these URLs (e.g., by looking for specific keywords or phrases in the URL) or can refer to a predetermined list of URLs that have been determined as non-relevant, e.g., by administrators of the system. As a result, the module 108 can remove these types of URLs from the collected corpus of URLs.

An example list of URLs is provided below, along with corresponding analysis regarding filtering of the URLs:

| URL | Analysis |
|---|---|
| http://oltx.abc.com/ftgw/fbc/ofsummary/summary | Intent-relevant; not filtered out |
| http://toa.abc.com/ftgw/toa/transfer/setupassettransfer | Intent-relevant; not filtered out |
| http://www.abc.com/tpv/logout_webxpress.shtml | Not intent-relevant (logout page); filtered out |

The clickstream analysis module 108 then parses (304) each intent-relevant URL into one or more tokens, where each token corresponds to a discrete text segment of the corresponding URL. For example, URLs typically contain certain non-alphanumeric characters (e.g., forward slashes, spaces, question marks) that denote separation between various parts of the URL. The module 108 can split the URL into separate sections according to the position of these non-alphanumeric characters in the overall URL string.

Using the above intent-relevant URLs, the clickstream analysis module 108 can split them as follows:

| URL | Tokens |
|---|---|
| http://oltx.abc.com/ftgw/fbc/ofsummary/summary | http oltx abc com ftgw fbc ofsummary summary |
| http://toa.abc.com/ftgw/toa/transfer/setupassettransfer | http toa abc com ftgw toa transfer setupassettransfer |

As part of this parsing step, the clickstream analysis module 108 can remove certain tokens that are considered generic or otherwise not relevant to intent. For example, the module 108 can remove standard types of tokens, such as 'http', 'com' or context-specific tokens that are not relevant to intent, such as 'abc'.

In some cases, the URLs can contain certain keywords that may require further processing. For example, if a user enters search terms and executes a search in a given web page, the web page that displays the search results may correspond to a URL that contains the specific search keywords (e.g., " . . . /results.html?search_keywords=book&Smith . . . "). Upon parsing the URL, the clickstream analysis module 108 can identify the search keywords 'book' and 'Smith' in the URL (e.g., because they follow the term 'search_keywords' in a specific syntax). These search terms can be included as tokens as well.

In some instances, the search keywords may be misspelled or mis-entered by the user—for example, a user looking for retirement advice may enter '410k plans', instead of '401k plans.' The clickstream analysis module 108 can automatically adjust the search keywords to fix any such errors by, e.g., comparing the entered keywords against a list of predefined keywords, determine a similarity score or other type of matching score, and selecting a keyword from the list that most closely matches the entered keyword.

In addition, in some cases, the URL can contain identifiers or other alphanumeric codes that correspond to specific items (e.g., model numbers, product IDs, CUSIP numbers, and so forth). The clickstream analysis module 108 can parse these types of identifiers out of the URL as tokens, identify them as specific types of identifiers, and retrieve further information and metadata associated with the identifier. The clickstream analysis module 108 can then include at least a portion of the additional information as part of the URL to be tokenized or as tokens themselves. For example, if the URL contains a CUSIP number for a specific financial security, the clickstream analysis module 108 can retrieve additional information about the CUSIP from, e.g., database 112 (such as the name of the security, description of the security, and the like) and include that information as tokens to be processed as part of the model generation described below.

After the tokens have been parsed, the clickstream analysis module 108 assigns (306) a time value to each token that is associated with at least one of the timestamps from the corresponding web browsing session. As mentioned above, the clickstream data can include timestamps and related information about the web browsing session. The clickstream analysis module 108 evaluates the timestamps and assigns a time value to the tokens based upon how long ago the web browsing session occurred—under the assumption that clickstream data generated more recently is more probative of the intent behind a subsequent voice call by that user than clickstream data that was generated farther in the past. For tokens that were parsed from URLs captured during a web browsing session that occurred within the last 24 hours, for example, the clickstream analysis module 108 can assign a time value of, e.g., '1 day,' for tokens parsed from URLs captured 24-48 hours ago, the module 108 can assign a time value of '2 days,' and so forth. It should be appreciated that many types of time value data can be assigned to the tokens, at various levels of granularity, without departing from the scope of invention.

Turning back to FIG. 2, the clickstream analysis module 108 then generates (206) a frequency matrix based upon the tokens. The frequency matrix comprises two values for each token parsed from URLs during a specific web browsing session. The first value is the frequency at which the token appears in the intent-relevant URLs in the particular session (also called "term frequency" or "TF"). The second value is a log transform of the inverse of the following ratio:

Number of distinct intent relevant URLs that include the token Number of intent relevant URLs in the session
(also called the inverse document frequency or "IDF").

Using the tokens from above intent-relevant URLs, the clickstream analysis module 108 can generate the following frequency matrix:

| Token | TF | IDF |
|---|---|---|
| ftgw | 2 | 0.1 |
| fbc | 1 | 0.2 |
| ofsummary | 1 | 0.2 |
| summary | 1 | 0.35 |
| toa | 2 | 0.15 |
| transfer | 1 | 0.3 |
| setupassettransfer | 1 | 0.45 |

Next, the clickstream analysis module 108 generates (208) a feature vector based upon the frequency matrix. The feature vector comprises a value for each token that is the product of the TF and IDF values from the frequency matrix:

TF×IDF

As an example, based upon the above frequency matrix, the corresponding feature vector generated by the module 108 is:

| Token | TF × IDF |
|---|---|
| ftgw | 0.2 |
| fbc | 0.2 |
| ofsummary | 0.35 |
| summary | 0.3 |
| toa | 0.3 |
| transfer | 0.45 |
| setupassettransfer | 0.4 |

Generally, it should be appreciated that the higher the value of TF×IDF is, the more relevant that token is to the intent of a subsequent voice call by the user. For example, a high weight in TF-IDF is reached by a high term frequency (in the given document) and a low document frequency of the term in the whole collection of documents. For example, the tokens 'transfer' and 'setupassettransfer' can indicate that the user at client computing device 101 was attempting to perform a particular transaction—i.e., an asset transfer—during a prior web browsing session, while the token 'ftgw' can indicate that the user at client device 101 was interacting with a certain module or web application (without specifying further detail).

In some cases, the clickstream analysis module 108 can further weight the tokens based upon the assigned time value. As mentioned above, an assumption is that clickstream data generated more recently is more probative of the intent behind a subsequent voice call by that user than clickstream data that was generated farther in the past. Therefore, the frequency matrix and/or the feature vector can be adjusted to account for the time value of each token. The module 108 creates feature vectors that capture the temporal proximity between a web activity and the event driven by an intent (e.g., customer call to the call center). It is empirically observed that activities occurring closer to the time of an event are more predictive of the intent. For example, a person that has visited a password reset page within the last five minutes is more likely to call customer support at the present time versus a person that had visited the same page ten days ago.

In some embodiments, the clickstream analysis module 108 can also integrate other types of data with the feature vector to generate a classification model to be used in classifying the intent for subsequent voice calls. For example, as mentioned above, the clickstream data corresponds to URLs accessed by a user at client computing device 101 during a web browsing session with web server 107. The user may be associated with a specific user ID (e.g., assigned by a corporation to identify its customers). As such, the clickstream data can include the user ID and/or the clickstream analysis module 108 can determine the user ID based upon other information in the clickstream data or associated with the web session (e.g., device identifiers, IP addresses, and the like). In this way, the module 108 can associate the tokens generated from that user's session clickstream data with the user ID and leverage that association to bring in 'offline' data about that user.

Figure 4:
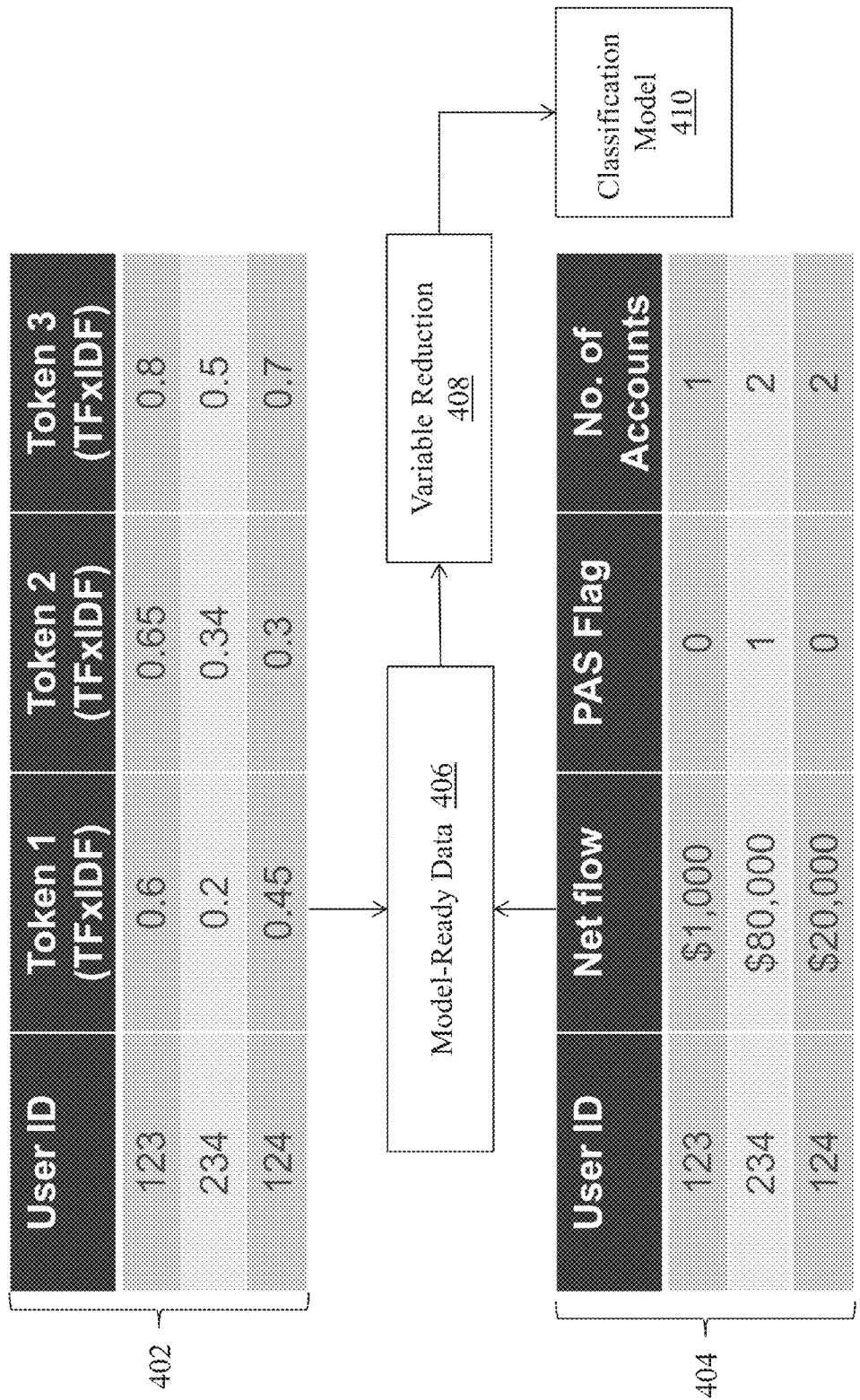
FIG. 4 is a diagram of a technique to merge clickstream data with offline data.

For example, the 'offline' data can comprise features derived from transactional and profile histories of the customer—such as net account balances, net flows, types of transactions performed, types of accounts held, days since a prior transaction, demographic information, and so forth. The clickstream analysis module 108 can merge this offline data with the feature vector to enhance the intent determination. FIG. 4 is an exemplary diagram of how the module 108 merges offline data with the feature vector.

As shown in FIG. 4, the URL-specific feature vector 402 (that in some embodiments is further limited based upon the time value associated with the tokens) is merged with the offline data 404 to generate a set of model-ready data 406. The model-ready data 406 is then processed by the clickstream analysis module 108 through a variable reduction engine 408 that streamlines the model-ready data 406 by selecting a subset of relevant features for use in generating the classification model 410, which is the model used by the clickstream analysis module 108 and call routing module 110 for determining intent and routing calls as is described in greater detail later in the specification. In one embodiment, the clickstream analysis module 108 uses random forest classifiers to perform the variable reduction technique.

Once the clickstream analysis module 108 has generated the classification model, the module 108 can use the model to determine intent of subsequent voice calls, e.g., to a call center. Turning back to FIG. 2, a user initiates a voice call via calling device 102 to the server computing device 106. For example, if the user had been browsing a particular web site recently via client device 101, the user may have further questions or wish to obtain specific information relating to the web browsing activity by calling a customer service number associated with the web site. Upon receiving (210) the voice call, the call routing module 110 of server computing device 106 identifies (212) that the calling device is associated with a user of the client computing device 101. As mentioned above, the call routing module 110 can obtain certain information associated with the caller and/or the calling device 102 (e.g., originating telephone number, device ID, user identity, and the like) and, e.g., retrieve a profile from database 112 that contains information to enable the call routing module 110 to associate a portion of the prior clickstream data with the incoming call. In some embodiments, the call routing module 110 can direct the voice call to the IVR system 114 to enable the IVR system 114 to automatically obtain information from the call with respect to, e.g., his or her identity and in some instances, the potential reason for his or her call.

After making the association, the call routing module 110 determines (214) intent for the incoming call based upon the feature vector and/or the classification model. As described previously, the call routing module 110 can analyze the feature vector and/or classification model to determine which token(s) can be used to predict the intent of the call. There may be a plurality of different intents stored by the system 100 and based upon the specific feature vector for the clickstream data generated from that user's prior web browsing sessions, the call routing module 110 can match the feature vector to one or more intents and determine a probable or predicted intent for the incoming call. For example, a customer calling in to update his or her beneficiaries on a trust account might realize that he/she has to provide a Power of Attorney (POA) to them as well. In this case, "Update Beneficiary" and "Power of Attorney" are correlated intents. As can be appreciated, a single call may have multiple intents and the routing logic embodied in the call routing module 110 can direct the call to a CSR that can handle all of the intents, or in some cases, a majority of the intents.

Once the intent has been determined, the call routing module 110 routes (216) the voice call to establish a connection between the calling device 102 and a destination device (e.g., a CSR computing device 116) that is capable of handling the call according to the intent. For example, the module 110 may determine that because the feature vector reveals that the user had been interacting with web pages relating to purchasing a specific product, the probable intent for the call is a question about the product, a question about the purchase, and similar topics. Therefore, the module 110 can select a particular destination device that is associated with a CSR who has certain experience with handling those types of inquiries.

Accurate and efficient routing of telephone calls at customer service centers has been a prevalent technical challenge. Existing routing systems typically fail to account for a customer's reason for calling, and thus either fail to route incoming calls to appropriate personnel or take extensive time on the call attempting to understand such reason—which leads to wasted time and inefficiency.

The invention described herein solves this particular technical challenge by providing an intelligent call routing architecture that further captures and dissects specific web-based session clickstream data to understand a customer's web activity in a time-limited fashion. The intelligent call routing architecture then dynamically and seamlessly leverages the clickstream data to automatically predict a potential (or probable) reason, or reasons (if all are likely), for a customer's subsequent call and efficiently route the call to an appropriate resource, thus producing significant time, efficiency, and throughput savings at the call center.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A method for automated routing of voice calls using time-based predictive clickstream data, the method comprising:
   capturing, by a server computing device at a first point in time, clickstream data corresponding to one or more web browsing sessions between a client computing device and a web server, the clickstream data comprising uniform resource locators (URLs) and one or more timestamps of the corresponding session;
   converting, by the server computing device, the clickstream data into tokens, comprising filtering the URLs to retain intent-relevant URLs;
      parsing each intent-relevant URLs into one or more tokens, each token comprising a discrete text segment of the corresponding URL;
      assigning a time value to each token that is associated with at least one of the timestamps from the corresponding web browsing session;
   generating, by the server computing device, a frequency matrix based upon the tokens, the frequency matrix comprising for each token and web browsing session (i) a frequency of the token appearing in the intent-relevant URLs in the session ("TF") and (ii) a log transform of an inverse of a ratio of number of distinct intent-relevant URLs that include the token over the number of intent-relevant URLs in the session ("IDF");
   generating, by the server computing device, a feature vector based upon the frequency matrix, the feature vector comprising for each token a value indicating a product of TF and IDF;
   receiving, by the server computing device at a second point in time, an incoming voice call from a remote device;
   identifying, by the server computing device, that the remote device is associated with a user of the client computing device;
   determining, by the server computing device, intent for the incoming voice call based upon the feature vector; and
   routing, by the server computing device, the incoming voice call to a destination device based upon the determined intent.

2. The method of claim 1, wherein the step of filtering the URLs comprises removing URLs from the clickstream data that are previously determined to be irrelevant to intent.

3. The method of claim 1, wherein the step of converting the clickstream data into tokens further comprises
   determining one or more tags embedded in a webpage that corresponds to one of the intent-relevant URLs; and
   capturing the tags as part of the clickstream data.

4. The method of claim 1, wherein the URLs include one or more search keywords, the method further comprising correcting errors in the search keywords by comparing the search keywords against a predefined list of keywords.

5. The method of claim 1, wherein the step of converting the clickstream data into tokens further comprises
   identifying one or more alphanumeric codes in the intent-relevant URLs that correspond to a financial security; and
   inserting other information relating to the financial security into the intent-relevant URL.

6. The method of claim 5, wherein the alphanumeric codes are CUSIP numbers.

7. The method of claim 1, wherein the step of parsing each intent-relevant URLs into one or more tokens comprises
   removing generic and user-specific portions of each intent-relevant URL based upon a predefined syntax;
   identifying one or more non-alphanumeric characters in the URL;
   splitting each intent-relevant URL into sections based upon a position of the non-alphanumeric characters in the URL;
   removing the non-alphanumeric characters from the URL; and
   identifying one or more tokens within each section.

8. The method of claim 1, wherein the time value assigned to each token is a past window of time during which the associated web browsing session occurred.

9. The method of claim 1, wherein the step of determining intent for the incoming voice call comprises weighting each token in the feature vector according to the assigned time value of the token.

10. The method of claim 9, wherein tokens with an assigned time value that is closer to the second point in time are given more weight than tokens with an assigned time value that is farther from the second point in time.

11. The method of claim 1, wherein the step of determining intent for the incoming voice call comprises comparing tokens in the feature vector with a predefined list of intents and selecting an intent from the predefined list of intents that matches the tokens in the feature vector.

12. The method of claim 1, wherein the step of identifying that the remote device is associated with a user of the client computing device comprises
   receiving a device identifier from the remote device;
   determining an identity of a user associated with the remote device based upon the device identifier; and
   determining that the identity of the user is also associated with the client computing device.

13. The method of claim 1, wherein the step of identifying that the remote device is associated with a user of the client computing device comprises
   receiving a user identifier from the remote device;
   determining an identity of a user associated with the remote device based upon the user identifier; and
   determining that the identity of the user is also associated with the client computing device.

14. A system for automated routing of voice calls using time-based predictive clickstream data, the system comprising a server computing device configured to:
   capture, at a first point in time, clickstream data corresponding to one or more web browsing sessions between a client computing device and a web server, the clickstream data comprising uniform resource locators (URLs) and one or more timestamps of the corresponding session;
   convert the clickstream data into tokens, comprising filtering the URLs to retain intent-relevant URLs;
      parsing each intent-relevant URLs into one or more tokens, each token comprising a discrete text segment of the corresponding URL;
      assigning a time value to each token that is associated with at least one of the timestamps from the corresponding web browsing session;
   generate a frequency matrix based upon the tokens, the frequency matrix comprising for each token and web browsing session (i) a frequency of the token appearing in the intent-relevant URLs in the session ("TF") and (ii) a log transform of an inverse of a ratio of number of distinct intent-relevant URLs that include the token over the number of intent-relevant URLs in the session ("IDF");

generate a feature vector based upon the frequency matrix, the feature vector comprising for each token a value indicating a product of TF and IDF;

receive, at a second point in time, an incoming voice call from a remote device;

identify that the remote device is associated with a user of the client computing device;

determine intent for the incoming voice call based upon the feature vector; and route the incoming voice call to a destination device based upon the determined intent.

15. The system of claim 14, wherein filtering the URLs comprises removing URLs from the clickstream data that are previously determined to be irrelevant to intent.

16. The system of claim 14, wherein converting the clickstream data into tokens further comprises determining one or more tags embedded in a webpage that corresponds to one of the intent-relevant URLs; and capturing the tags as part of the clickstream data.

17. The system of claim 14, wherein the URLs include one or more search keywords, the server computing device configured to correct errors in the search keywords by comparing the search keywords against a predefined list of keywords.

18. The system of claim 14, wherein converting the clickstream data into tokens further comprises identifying one or more alphanumeric codes in the intent-relevant URLs that correspond to a financial security; and inserting other information relating to the financial security into the intent-relevant URL.

19. The system of claim 18, wherein the alphanumeric codes are CUSIP numbers.

20. The system of claim 14, wherein parsing each intent-relevant URLs into one or more tokens comprises removing generic and user-specific portions of each intent-relevant URL based upon a predefined syntax;

identifying one or more non-alphanumeric characters in the URL;

splitting each intent-relevant URL into sections based upon a position of the non-alphanumeric characters in the URL;

removing the non-alphanumeric characters from the URL; and identifying one or more tokens within each section.

21. The system of claim 14, wherein the time value assigned to each token is a past window of time during which the associated web browsing session occurred.

22. The system of claim 14, wherein determining intent for the incoming voice call comprises weighting each token in the feature vector according to the assigned time value of the token.

23. The system of claim 22, wherein tokens with an assigned time value that is closer to the second point in time are given more weight than tokens with an assigned time value that is farther from the second point in time.

24. The system of claim 14, wherein determining intent for the incoming voice call comprises comparing tokens in the feature vector with a predefined list of intents and selecting an intent from the predefined list of intents that matches the tokens in the feature vector.

25. The system of claim 14, wherein identifying that the remote device is associated with a user of the client computing device comprises receiving a device identifier from the remote device;

determining an identity of a user associated with the remote device based upon the device identifier; and determining that the identity of the user is also associated with the client computing device.

26. The system of claim 14, wherein identifying that the remote device is associated with a user of the client computing device comprises receiving a user identifier from the remote device;

determining an identity of a user associated with the remote device based upon the user identifier; and determining that the identity of the user is also associated with the client computing device.

27. A computer program product, tangibly embodied in a non-transitory computer readable storage device, for automated routing of voice calls using time-based predictive clickstream data, the computer program product including instructions operable to cause a server computing device to:

capture, at a first point in time, clickstream data corresponding to one or more web browsing sessions between a client computing device and a web server, the clickstream data comprising uniform resource locators (URLs) and one or more timestamps of the corresponding session;

convert the clickstream data into tokens, comprising filtering the URLs to retain intent-relevant URLs;

parsing each intent-relevant URLs into one or more tokens, each token comprising a discrete text segment of the corresponding URL;

assigning a time value to each token that is associated with at least one of the timestamps from the corresponding web browsing session;

generate a frequency matrix based upon the tokens, the frequency matrix comprising for each token and web browsing session (i) a frequency of the token appearing in the intent-relevant URLs in the session ("TF") and (ii) a log transform of an inverse of a ratio of number of distinct intent-relevant URLs that include the token over the number of intent-relevant URLs in the session ("IDF");

generate a feature vector based upon the frequency matrix, the feature vector comprising for each token a value indicating a product of TF and IDF;

receive, at a second point in time, an incoming voice call from a remote device;

identify that the remote device is associated with a user of the client computing device;

determine intent for the incoming voice call based upon the feature vector; and route the incoming voice call to a destination device based upon the determined intent.

\* \* \* \* \*